June 7, 1966 W. L. ALDEN 3,254,608
VEHICLES AND TRANSPORTATION SYSTEMS
Filed March 29, 1965 10 Sheets-Sheet 1

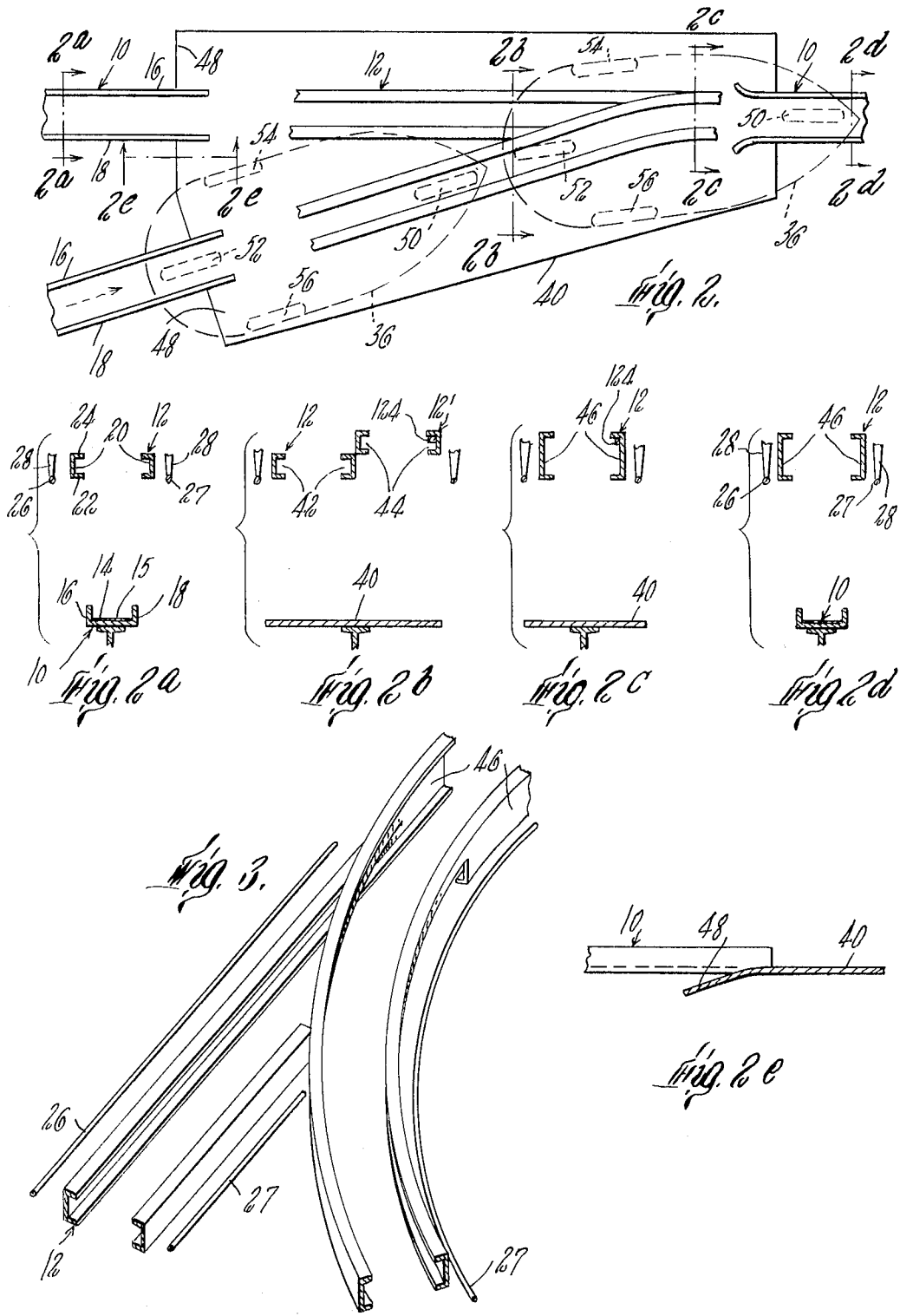

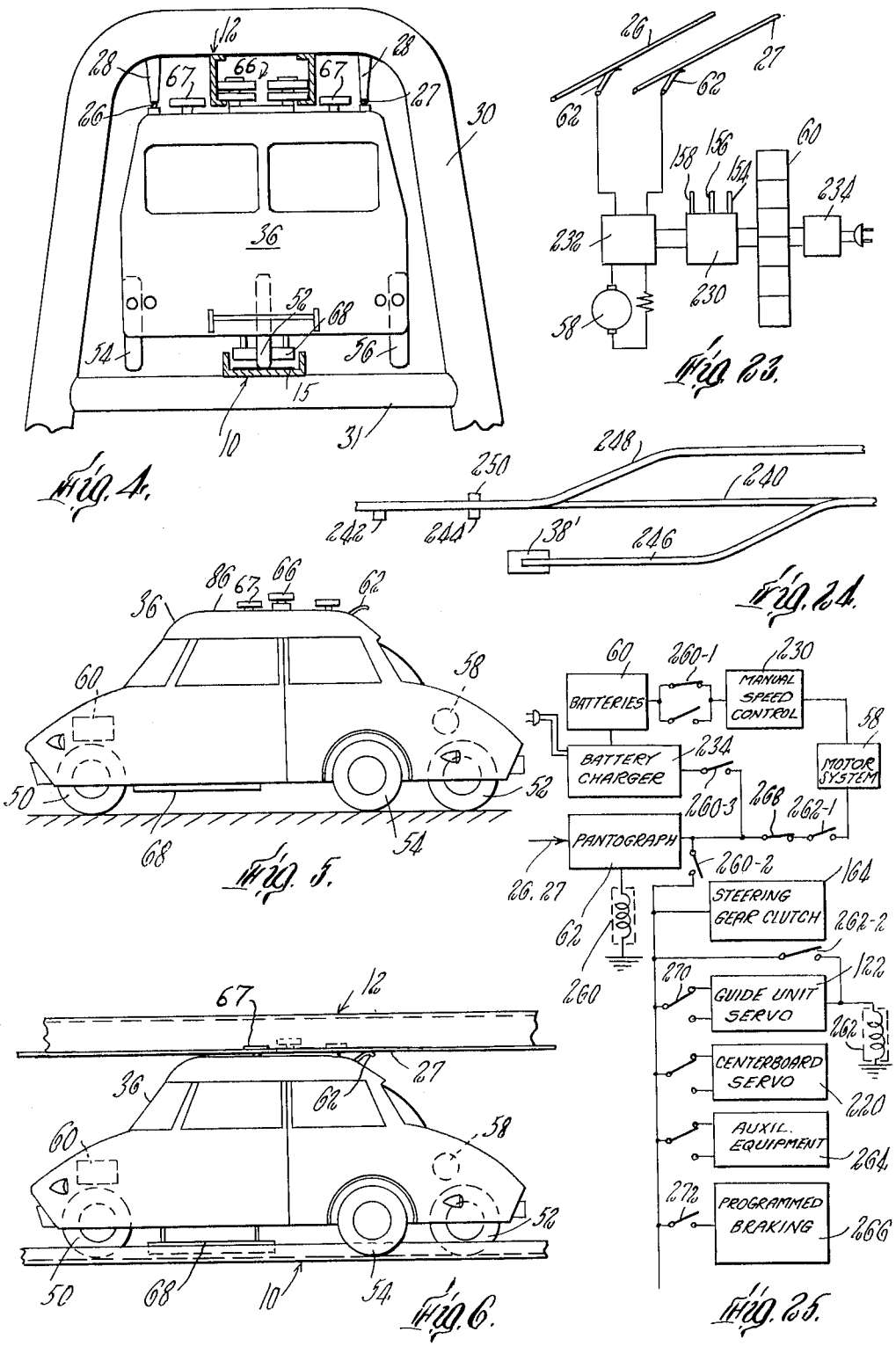

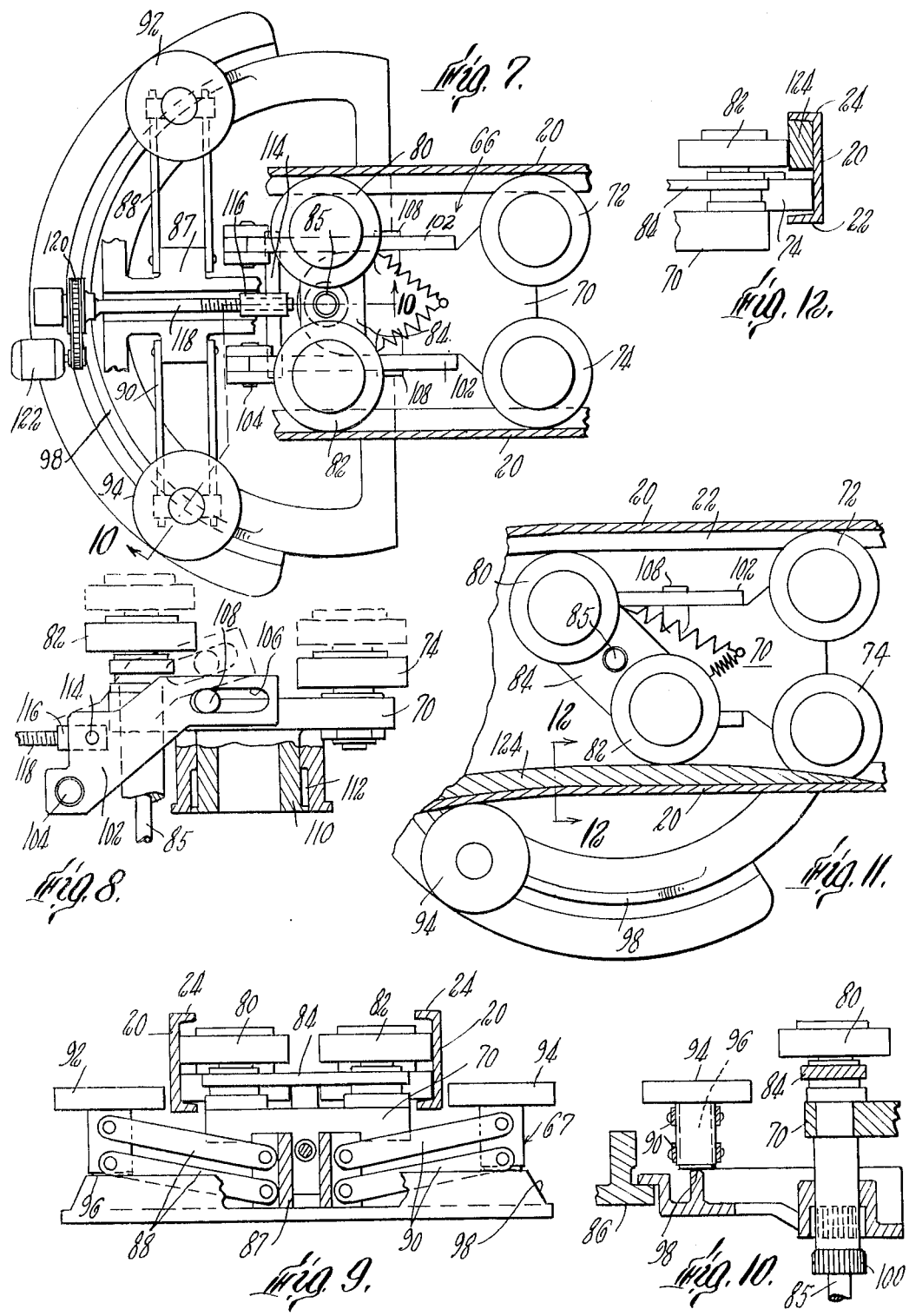

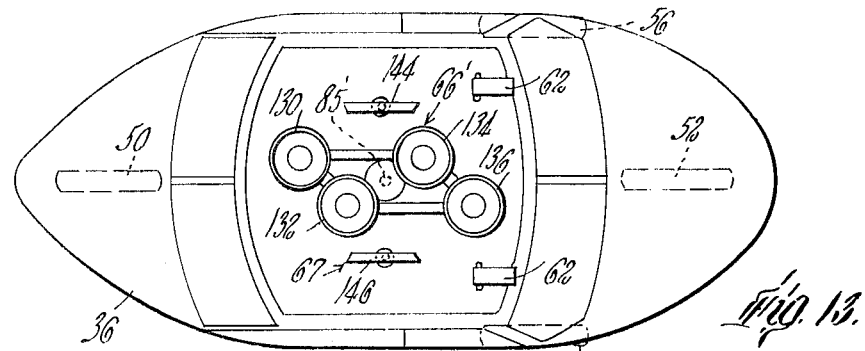
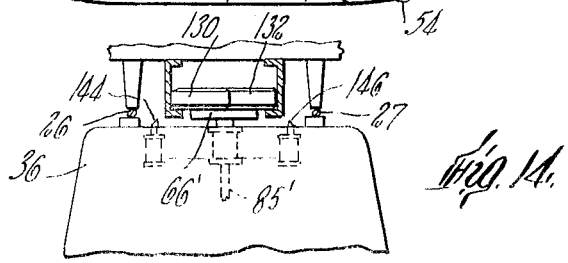
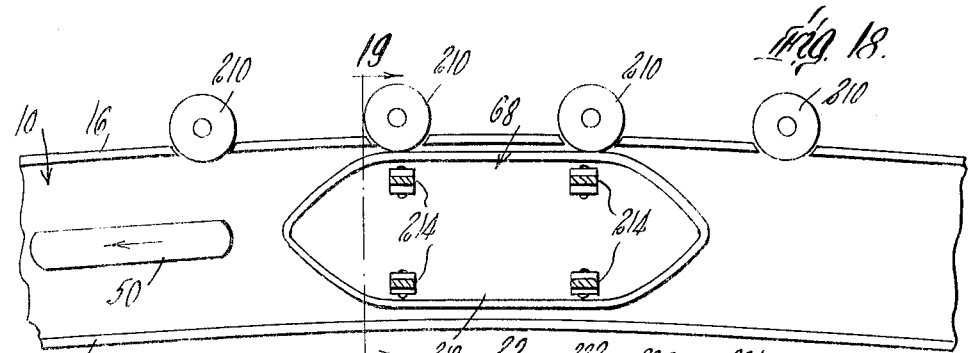
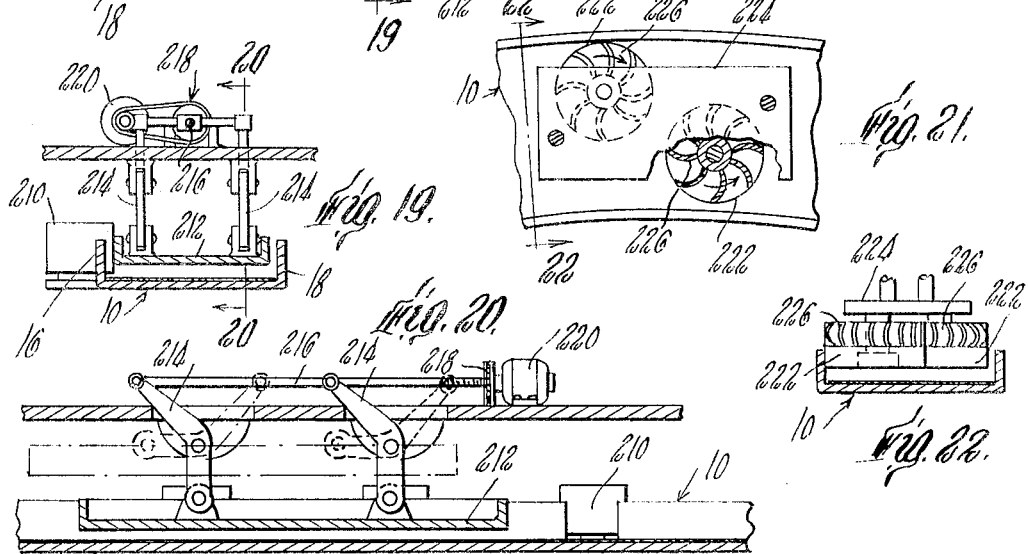

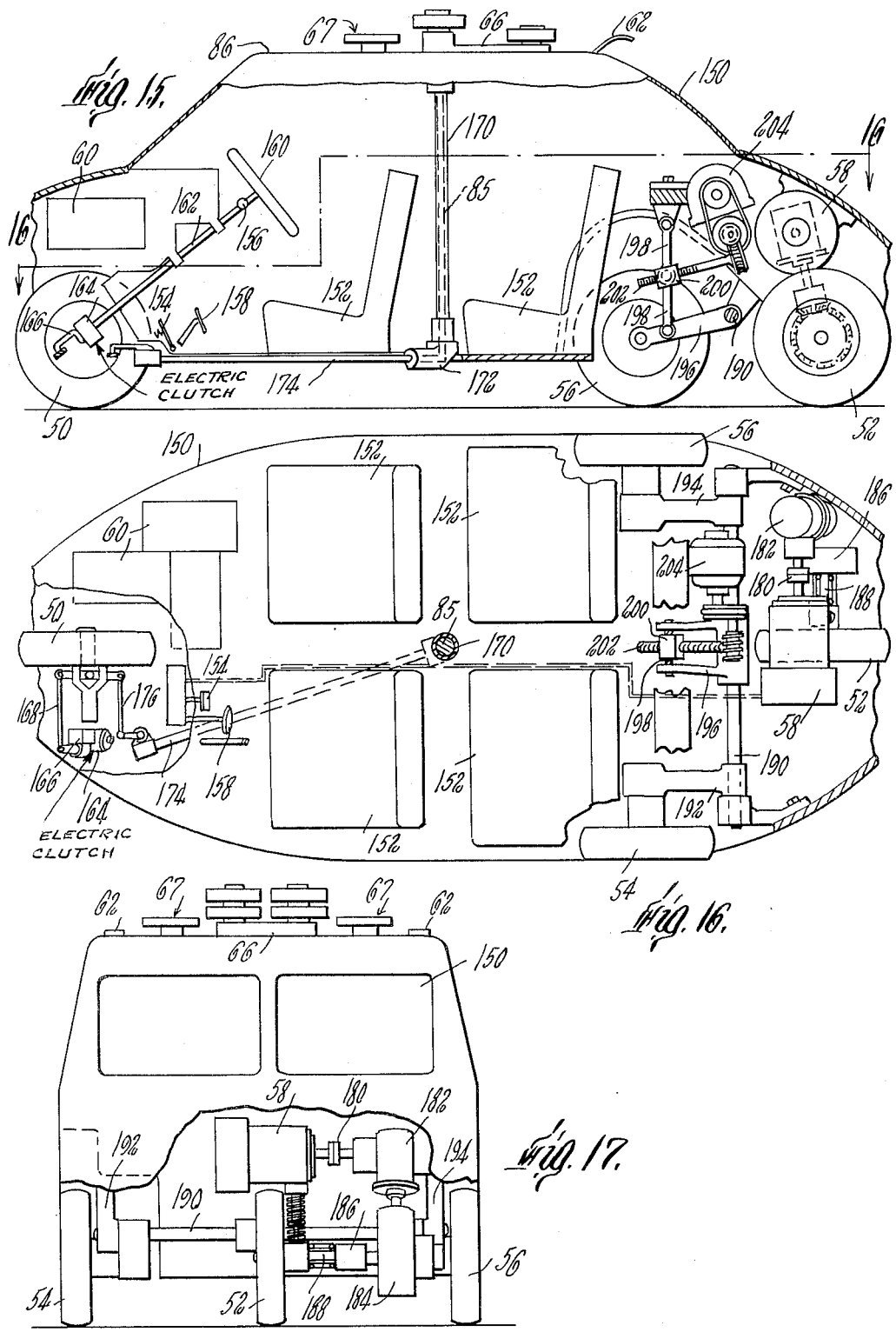

June 7, 1966 W. L. ALDEN 3,254,608
VEHICLES AND TRANSPORTATION SYSTEMS
Filed March 29, 1965 10 Sheets-Sheet 7

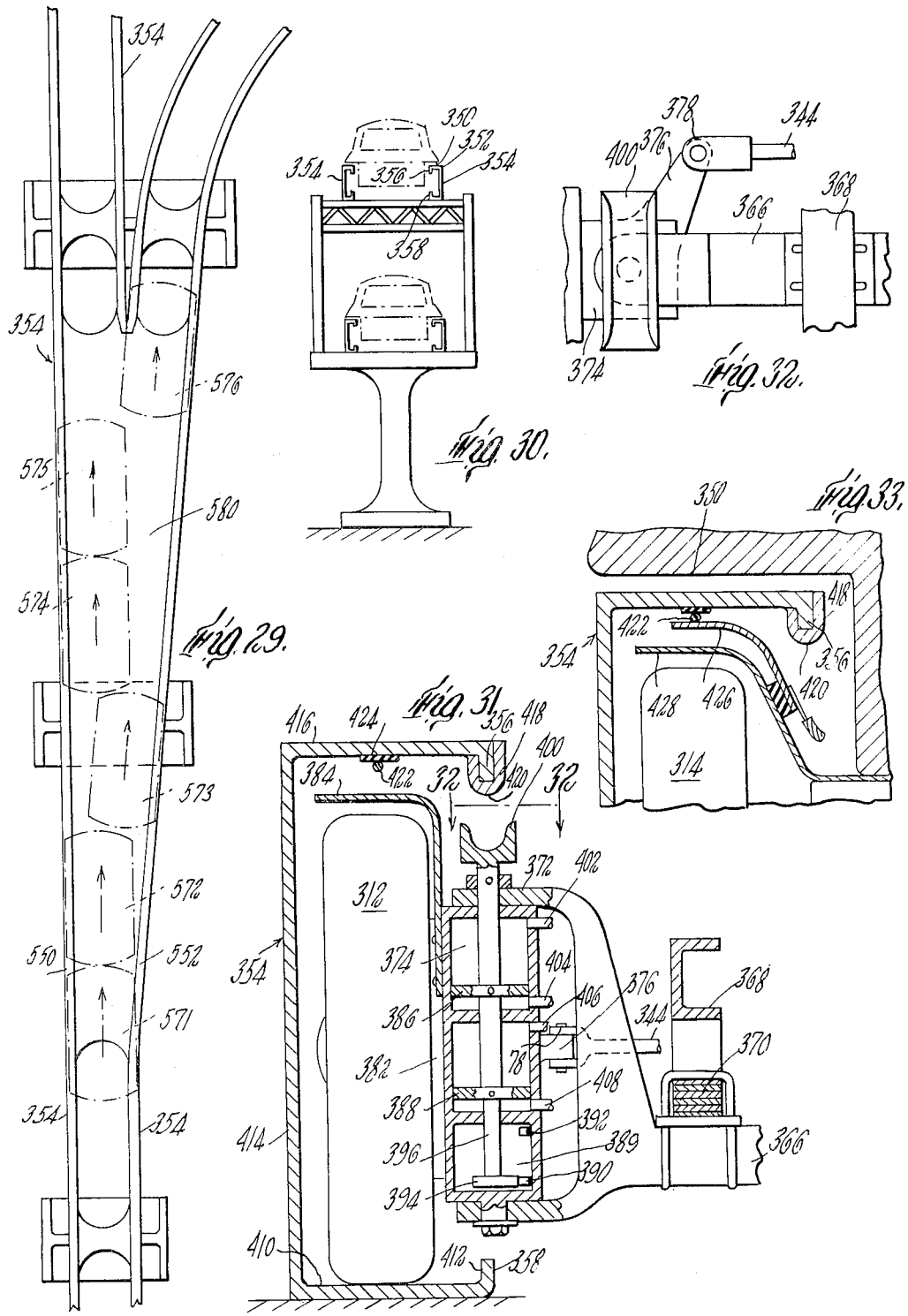

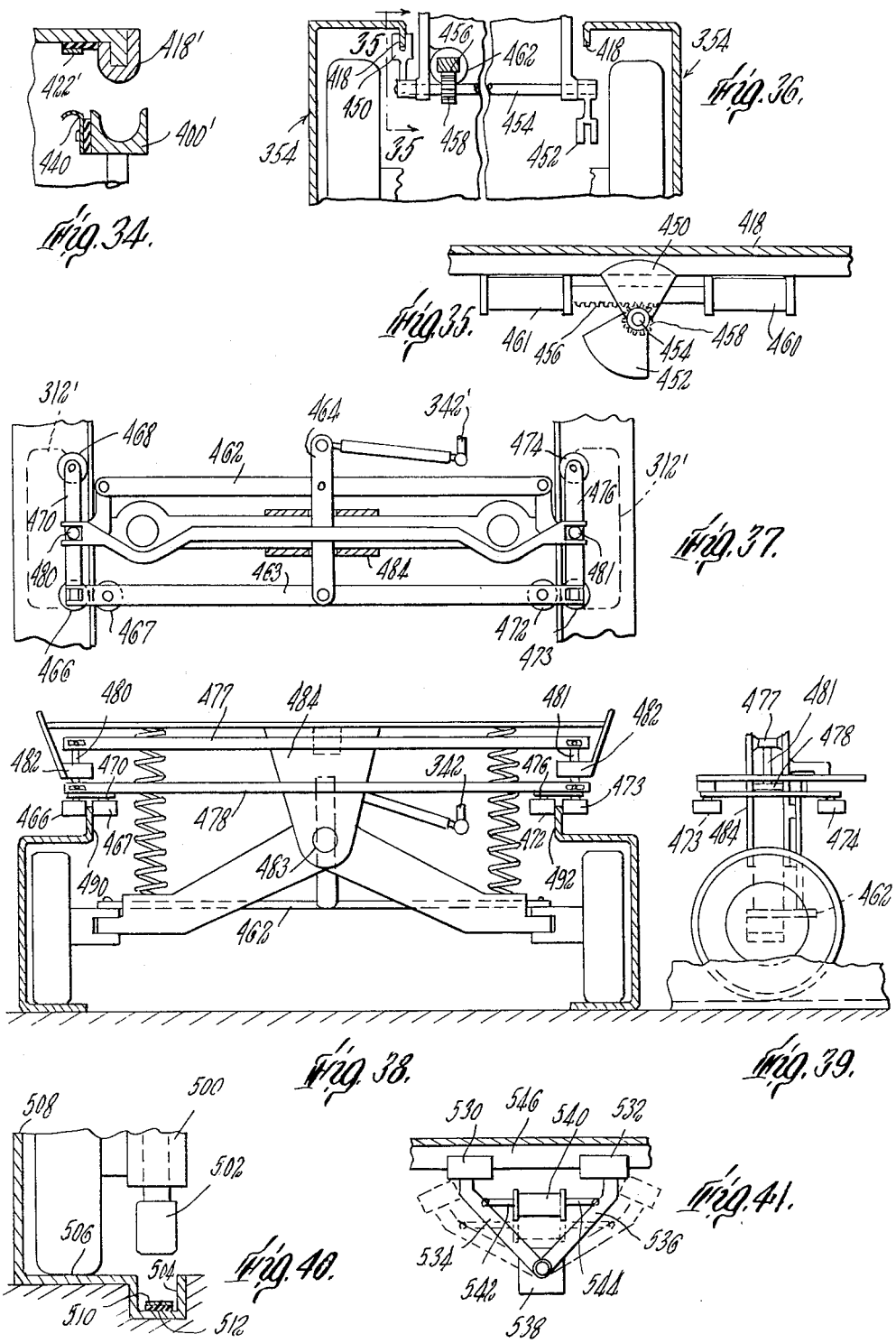

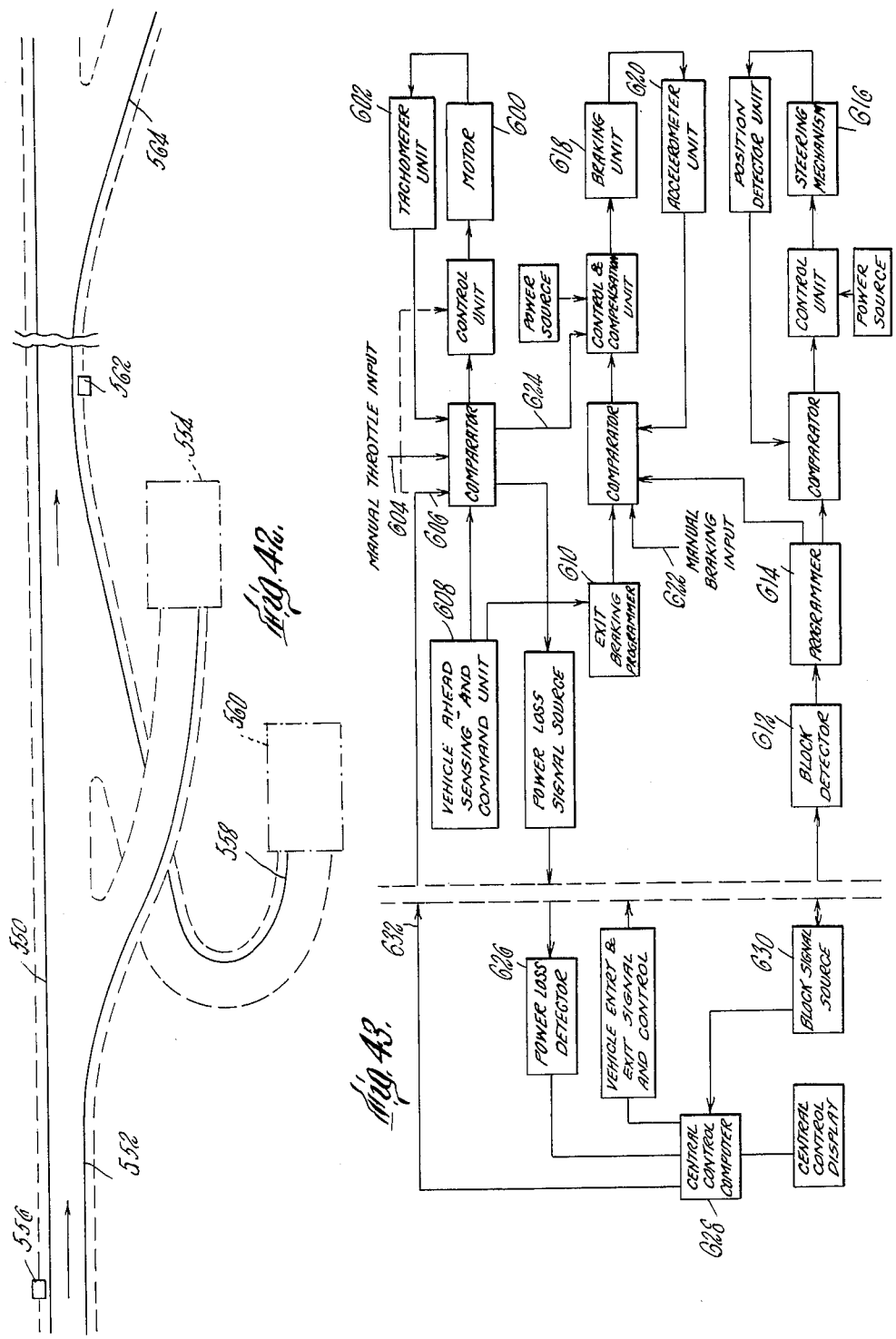

United States Patent Office 3,254,608
Patented June 7, 1966

3,254,608
VEHICLES AND TRANSPORTATION SYSTEMS
William L. Alden, Westboro, Mass., assignor to Alden Self-Transit Systems Corporation, Westboro, Mass., a corporation of Massachusetts
Filed Mar. 29, 1965, Ser. No. 446,772
31 Claims. (Cl. 104—149)

This invention relates to transportation systems and to vehicles useful on such systems. This application is a continuation-in-part of my copending applications Serial Nos. 159,930, filed December 18, 1961, now abandoned, and 216,451, filed August 13, 1962, now abandoned.

Considerable concern exists as to the adequacy of mass transportation systems presently employed in metropolitan areas. Automobile highway systems, the present most commonly used transportation medium, while offering great convenience through the use of personal vehicles, have major disadvantages in terms of construction expense, the amount of land required (both from cost and aesthetic viewpoints), the lower passenger density on the highways as compared with other transportation systems, automobile parking problems in the metropolitan areas, and air pollution caused by the presently used vehicles. Conventional rail systems apparently do not provide an adequate solution and many are in financial difficulty. Among the various systems that have been proposed are monorail systems which employ large multi-passenger vehicles either supported on or suspended from a rail system. While such systems employ technological advances and reduce right of way costs, they involve many of the limitations of conventional railroad systems including the necessity of spaced stations to embark and debark passengers which limits the overall speed to which the vehicles can operate; relatively high initial and operating costs; rail complexities as in switching arrangements; and high cost of the vehicles, both initially and in storage and maintenance. Other proposed systems include the automatic control of automobiles as by means of a guidance system embedded beneath the surface of the pavement; systems utilizing compressed air supported vehicles; modified vehicle propulsion techniques; and commuter type rail transport systems for automobiles. The complexity, the resulting unreliability, and apparent great cost of the systems proposed to accommodate conventional automobiles, trucks and busses perhaps limits their usefulness.

A principal object of the invention is to provide a new and improved transportation system.

It is a general object of this invention to provide a novel and improved transportation system which may be advantageously employed both in commuting environments adjacent metropolitan areas for example and also in high speed longer distance transportation environments.

Another object of the invention is to provide a transportation system which enables integration of private vehicles such as may be driven on highways in conventional manner into a high density controlled transportation system.

A further object of the invention is to provide an improved vehicle control system which facilitates high speed switching of individual vehicles between lines of the system.

Still another object of the invention is to provide a novel form of vehicle arranged for conventional private manual control on highways and for automatic control in a high density transportation system.

A further object of this invention is to provide a novel and improved vehicle steering control mechanism useful for controlling vehicles in a transportation system.

Still another object of the invention is to provide a new and improved form of automatic vehicle steering control which is easily accommodated into a vehicle that may be manually controlled in a conventional manner.

The transportation system constructed in accordance with principles of the invention employs an arrangement of a drive surface and a guide and switching control unit extending parallel to and spaced from the drive surface. The vehicles employed in a preferred embodiment of the system are relatively small two or four passenger vehicles for example, which are electrically powered and are arranged to permit manual control (suitable for conventional driving on highways) and automatic control (used when the vehicle is in the transportation system). Control is automatically transferred at the point that the vehicles enter the transportation system and power is supplied to the vehicle by the system while the vehicle is on the system. An adjustable guide mechanism in the vehicle cooperates with the control unit to guide and switch the vehicle in accordance with the position of the guide mechanism.

The invention provides a private vehicle system in which individual manually controlled vehicles may be incorporated into an automatically controlled high density transportation system. The system enables high speed, controlled movement of vehicles and may be employed in elevated rail configurations similar to monorail proposals in a form which employs lighter duty track structures than existing or proposed railroad or monorail systems due to a lower wheel loading factor. The system utilizes electric power and, with its minimal right of way costs and reduction of required labor, the system is comparatively inexpensive both in construction and in operation. In addition, wide use of the preferred form of this type of vehicle will significantly reduce the exhaust fume atmospheric contamination problem associated with the internal combustion engine. The invention provides a supervisable transportation system that is flexible to accommodate both commuting traffic as well as long distance traffic with the desirable feature of private vehicles while affording additional advantages in controlled parking and storage arrangements.

Other objects, features and advantages of the invention will be seen as the following description of preferred embodiments thereof progresses in conjunction with the drawings, in which:

FIG. 2 is a plan view of one embodiment of a rail junction employed in the transportation system illustrating features of the stabilizing platform associated with the drive rail unit and the junction portion of the guide rail unit, the rail extensions of the guide rail unit corresponding to the illustrated drive rail portions not being shown;

Figure 26:
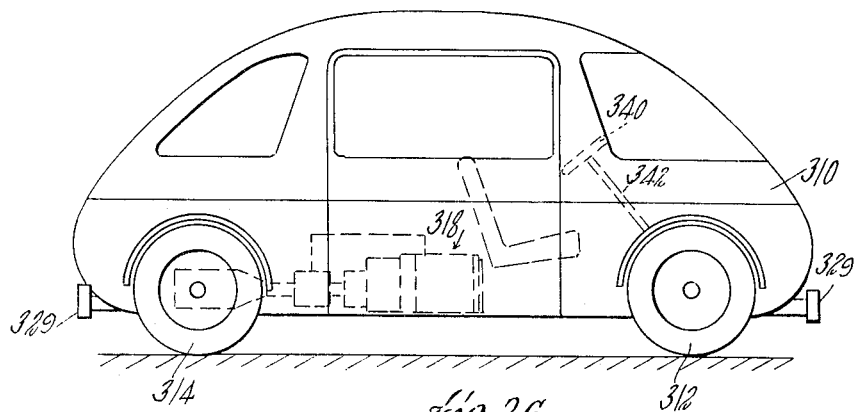
Figure 27:
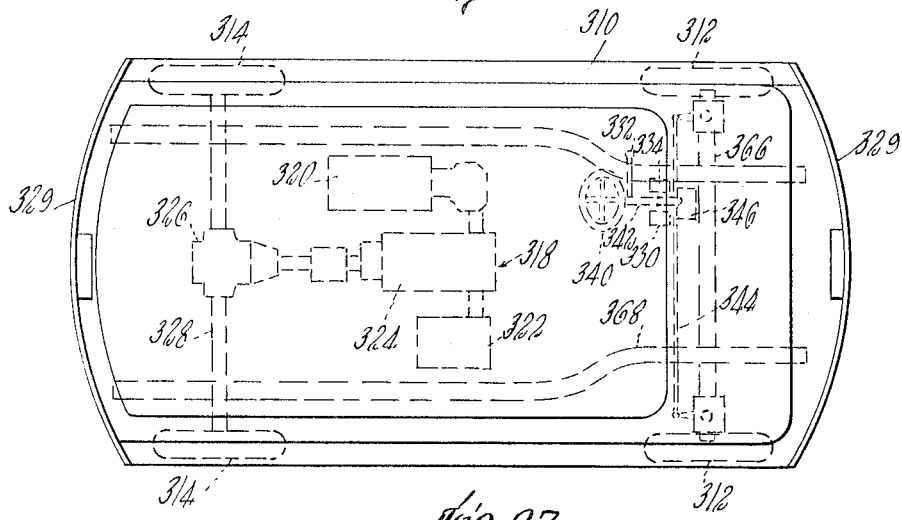
Figure 28:
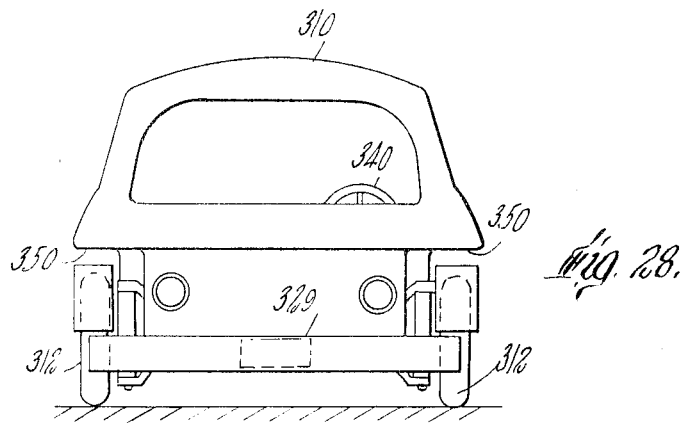

FIGS. 2a, 2b, 2c, 2d and 2e are sectional views through portions of the rail junction taken along the lines 2a, 2b, 2c, 2d and 2e of FIG. 2 respectively;

FIG. 3 is a perspective view of a guide rail junction illustrating certain features thereof;

FIG. 4 is an end view of a vehicle on a rail system with its control mechanism engaged with the guide rail unit;

FIG. 5 is a side elevational view of a vehicle constructed in accordance with principles of the invention illustrated on an ordinary highway;

FIG. 6 is a similar side view of the vehicle shown in FIG. 5 in position on a rail system constructed in accordance with principles of the invention;

FIG. 7 is a top view of one form of guide unit employed with vehicles constructed in accordance with the invention;

FIG. 8 is a side view of the guide unit shown in FIG. 7;

FIG. 9 is a front view of the guide unit shown in FIG. 7 with parts thereof broken away;

FIG. 10 is a sectional view taken along the line 10—10 of FIG. 7;

FIG. 11 is a top view of the guide unit similar to FIG. 7 with the steering wheels in rotated position;

FIG. 12 is a sectional view taken along the line 12—12 of FIG. 11;

FIG. 13 is a top view of a vehicle showing a second form of guide structure and auxiliary stabilizing elements;

FIG. 14 is an end view of the guide unit and the auxiliary stabilizing element configuration shown in FIG. 13;

FIG. 15 is a side elevational view through the vehicle shown in FIGS. 4–6 illustrating certain details of the drive and steering mechanism;

FIG. 16 is a sectional view of the vehicle taken along the line 16—16 of FIG. 15;

FIG. 17 is an end view of the vehicle shown in FIG. 15 with certain portions of the vehicle body broken away to better illustrate the drive mechanism;

FIGS. 18–20 are top, end and side views respectively of one form of lateral guide structure that cooperates with the lower rail unit;

FIGS. 21 and 22 are diagrammatic views of a second form of lateral guide structure that cooperates with the lower rail unit;

FIG. 23 is a diagram illustrating features of the electrical control system of the vehicle;

FIG. 24 is a diagram of a portion of the main line track and associated spurs illustrating certain control arrangements;

FIG. 25 is a block schematic diagram of one form of electrical control circuitry;

FIG. 26 is a side view of another vehicle constructed in accordance with principles of the invention showing the general configuration of the vehicle and location of drive components therein;

FIG. 27 is a top view of the vehicle shown in FIG. 26;

FIG. 28 is a front view of the vehicle shown in FIG. 26;

FIG. 29 is a top view of a section of a track of a transportation system constructed in which vehicles of the type shown in FIGS. 26–28 are shown in diagrammatic forms;

FIG. 30 is an elevational view showing a two level transportation system;

FIG. 31 is a detailed view of another embodiment of a vehicle steering control structure constructed in accordance with principles of the invention;

FIG. 32 is a top view of the steering control structure associated with one of the front wheels taken along the line 32—32 of FIG. 31;

FIG. 33 is a diagrammatic view of one form of control power input to the vehicle from the transportation system as employed with the steering control structure shown in FIGS. 31 and 32;

FIGS. 34–36 are an end view, side view and top view respectively of a modified embodiment of a guide structure and cooperating steering control structure constructed in accordance with principles of the invention;

FIGS. 37–39 are side view, top view and front view of another embodiment of steering control apparatus;

FIGS. 40 and 41 are diagrammatic illustrations of the construction of still other forms of control structure;

FIG. 42 is a diagram of another track system illustrating features of the invention; and FIG. 43 is a block diagram of another control system employed in a transportation system constructed in accordance with the invention.

Figure 1:
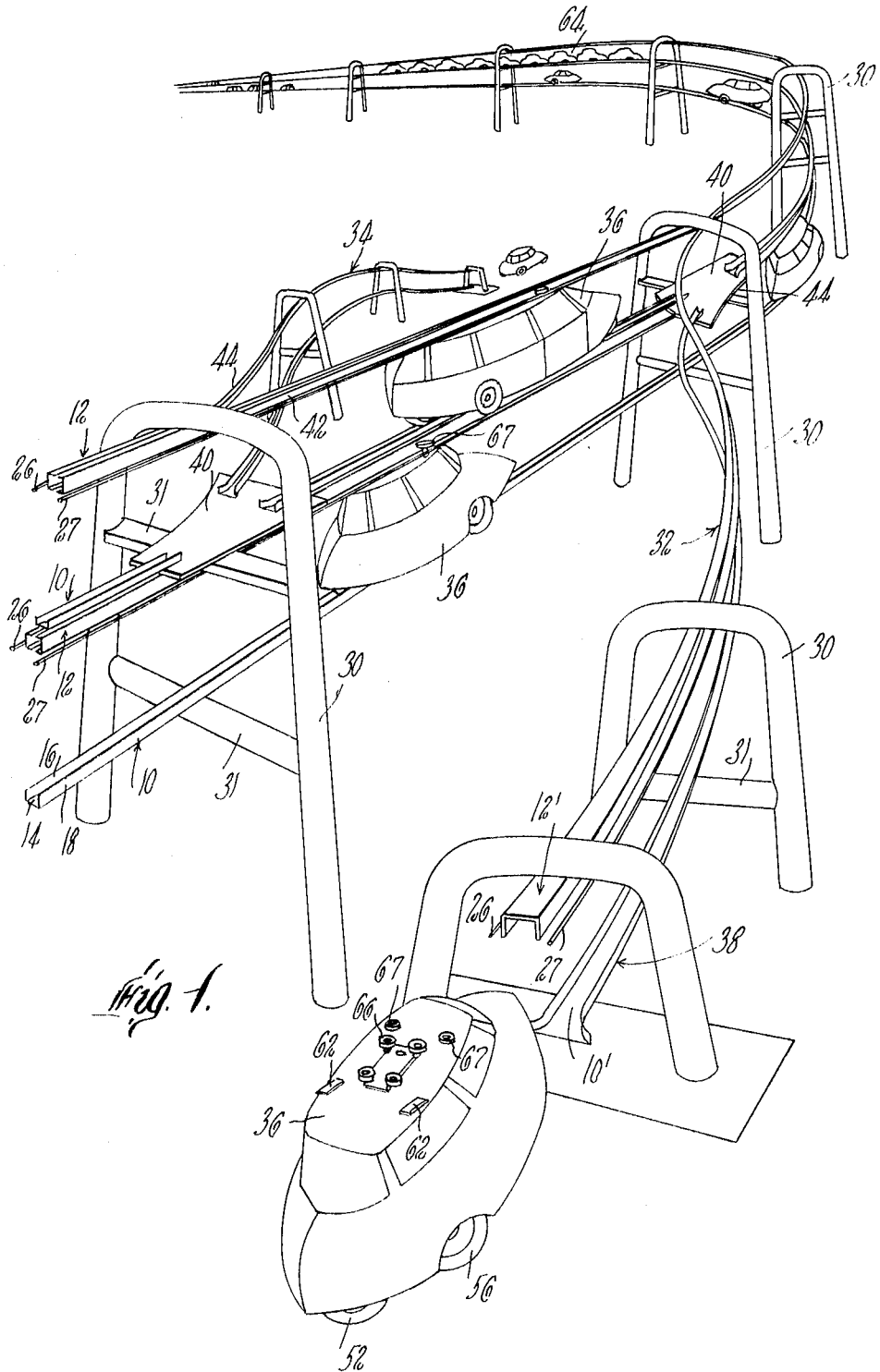
FIG. 1 is a diagrammatic view of a portion of a transportation system constructed in accordance with principles of the invention illustrating certain features thereof.

A portion of a main line of a transportation system constructed according to principles of the invention with associated entrance and exit spurs is shown in diagrammatic form in FIG. 1. Two superimposed main rail lines are illustrated for travel in opposite directions. As indicated in that figure each rail line includes a lower support and drive rail unit 10 and an upper guide and control rail unit 12. As indicated better in FIGS. 2a–d the lower rail unit is a U-shaped rail having a smooth horizontal surface 14 (which may be paved with suitable asphalt material 15 for example to increase the frictional coaction with the vehicle wheels that engage that surface) and two upstanding flanges 16, 18 provided for guide and safety purposes. The upper rail unit 12 consists of two spaced rails each of which includes a vertical guide surface 20 and two inwardly turned spaced flanges 22, 24 respectively. System power supply conductors 26, 27 are supported by insulators 28 on either side of the guide rail unit 12. These rail units 10, 12 of each line are maintained in proper spaced relation by support structures 30 which have horizontal support members 31 to which the rail units are secured. The rail units are disposed generally in vertical relation except at curves at which the lower unit is offset to provide a banked condition.

Also illustrated in FIG. 1 are spur areas 32, 34 each of which includes a lower rail unit 10' and an upper rail unit 12'. Each track spur permits vehicles 36 to enter or exit the system. Entrance portions of the lower rail unit 10 may be initially flared to better receive the vehicle components that cooperate with those rail portions and optionally may be restricted at a subsequent point or "launching area" 38 to provide accurate positioning of the vehicle relative to the guide rail unit 12 at that point.

As indicated in FIGS. 1 and 2, at the rail junction points the flanges 16, 18 of the lower rail unit 10 are omitted and the drive surface 14 is widened into a platform area 40. The upper rail unit 12 melds two different control levels at the junction, a lower level 42 for the main line and an upper (switching) level 44 for the spur line. The upper horizontal flange of level 42 and the lower horizontal flange of level 44 are omitted after the two lines have joined (FIGS. 2c and 2d) to define a single guide rail 46 of double height which permits transition of the vehicle control unit between the higher level and to the lower level. This transition is required only at junction points and the control rail unit 12 need be only of the single height indicated in FIGS. 2a and 2b between junction points. As indicated in FIG. 2e the entrance portion of the junction platform 40 may be a depressed apron 48 so the vehicle's entrance is a gradual transition. A perspective view of the guide rail 12 at an entrance junction shown in FIG. 3 further illustrating the above discussed features.

Perspective views of typical vehicles 36 used on the system are shown in FIG. 1; an end view in FIG. 4; and side views in FIGS. 5 (highway) and 6 (rail). Each vehicle has four foam-filled, rubber tired road wheels which are arranged in these embodiments as follows: a steerable front wheel 50 and a driven back wheel 52 on the axial center line of the vehicle and two side or outrigger wheels 54, 56 which provide lateral support when the vehicle is traveling on the ground independently of the rail system and also while passing through rail junction points on the system. In a modified embodiment the rail junction platforms 40 are omitted and the flanges 16, 18 are not interrupted but are connected together in manner similar to the guide rail units (but without a height transition). The vehicles employed in such a rail system incorporate a mechanism for elevating the outrigger wheels sufficiently to clear these flanges at the junctions. The vehicle is powered by an electric motor 58 connected to the rear wheel 52 by suitable drive arrangement and a group of storage batteries 60 carried by the vehicle supply power to the motor when the vehicle is on the ground under manual control. (Other vehicle carried power supplies such as fuel cells may be used where advantageous. In certain circumstances it may be desirable to supplement the electric motive power with an internal combustion engine for alternative use.) Suitable current collecting mechanisms 62 such as pantographs, rotatable discs or spring loaded conductor shoes cooperate with power supply conductors 26, 27 associated with the rails. The batteries are switched out of and the collector mechanisms switched into operative circuit relation with the motor when the vehicle is on the rail system. The vehicles may conventionally include auxiliary recharging circuits connectable to domestic electric service for recharging the batteries while the vehicle is not in use and also may include provision for recharging the batteries while the vehicle is receiving power from the system. Other system power supply arrangements for supplying electric power to the vehicles, such as conductor arrangements associated with the lower rail unit 10 also may be used in practicing the invention.

A vertically reciprocable guide unit 66 is supported above the vehicle roof. This guide unit, which may be arranged for relocation into the roof if desired for aesthetic purposes for example, cooperates with the guide rail unit 12 when the vehicle is on the rail system and is connected to the steerable wheel 50 to provide a guiding function in addition to providing lateral support. By separating the drive functions of rail unit 10 from the switching and guiding functions of rail unit 12 a system of accurate control is achieved which avoids many complex switching and vehicle spacing problems that are associated with physical rail switching movements. In addition the vehicle spacing on the main line need not be a function of switching rail movement times but rather individual vehicles can be switched out of a train of closely spaced vehicles (indicated in FIG. 1 at 64) while all the vehicles are moving at high speed. This switching arrangement also enables simple but flexible automated parking and storage arrangements. The switching function is accomplished merely by changing the position of the guide mechanism, in the illustrated embodiments by raising the guide unit 66 carried above the roof of the vehicle to a higher level.

Auxiliary vehicle stabilizing components include stabilizing guides 67 which cooperate with the outer surface of the guide rail unit 12; and a "centerboard" structure 68 which is lowered to be disposed between the flanges 16, 18 of the drive rail unit 10 when the vehicle is on the rail system.

One form of the guide unit 66 is shown in FIGS. 7-12. In the configuration a support structure 70 carries a pair of wheels 72, 74 used for providing lateral support which are mounted for rotation about fixed axes on the support base 70. Forward of the lateral support wheels 72, 74 is a pair of steering guide wheels 80, 82 that are mounted on a yoke 84 disposed for rotation on the support structure 70. The yoke is connected to a splined steering link 85. The wheels 80, 82 may be eccentrically mounted on their shafts to permit adjustment for tire wear. It will be noted that the steering guide wheels 80, 82 are mounted at a higher level than the lateral support wheels 72, 74 as indicated in FIG. 8.

Positioned forwardly of the steering guide wheels and fixed to the roof 86 of the vehicle is an upstanding flanged stud 87. Secured to each flange is a parallelogram linkage 88, 90 to the outer end of which is secured a supplementary guide structure 67. Each guide structure includes rotatable wheel members 92, 94 mounted on columnar stub shafts 96, the lower ends of which ride on a camming surface 98 that is engaged with spline 100 for movement with the yoke 84 when the guide unit is in its upper position.

Associated with the guide unit 66 is an elevating mechanism which moves the support base 70 and wheels 72, 74, 80 and 82 from a lower or operating position to an upper or switching position (shown in dotted lines in FIG. 8). The elevating mechanism associated with the guide unit shown in FIGS. 7-12 includes a pair of slotted levers 102 that are mounted for movement about a fixed pivot point 104 secured to the vehicle. Each lever has a slot 106 which receives a pin 108 secured to the support structure 70. The base structure has a rectangular guide surface 110 which cooperates with a correspondingly formed channel 112 in the vehicle and is arranged to permit controlled vertical movement from the position shown in solid lines in FIG. 8 to the position shown in dotted lines in that figure. The slotted levers 102 are connected by a link 114 (best shown in FIG. 7) which carries a nut 116 that cooperates with a threaded shaft 118. The shaft is driven by a sprocket and chain mechanism 120 under control of an electric motor 122.

In operation the steering wheels 80, 82 are biased to their normal position as shown in FIG. 7 by suitable spring means. Where the track is curved, as in a curve on the main line or at a switching junction, a vertical cam surface 124 is positioned in the guide rail member on the inside of the curve in the upper portion thereof (as indicated in FIGS. 11 and 12). When the steering wheels 80, 82 engage this cam, they are turned to a position as dictated by the dimensions of the cam to cause a proportioned movement of the coupled shaft 85 which adjusts the steerable wheel 50 for guiding the vehicle around the curve.

When the guide unit is raised, this turning of the steering yoke 84 engages spline 100 and also causes a proportioned movement of the camming surface 98 that supports the stabilizing guides 67 so that the supplementary guide wheel 92 or 94 opposite the spur is automatically lowered a distance sufficient to clear the lower edge of flange 22 of the guide rail. This mechanism provides clearance of the supplemental guide at switching junctions as necessary between the main line rail and a spur rail when the vehicle is being shunted off onto a spur line or the vehicle is entering the main line. The supplementary guide wheel on the inside of the spur remains up to provide support of the vehicle against centrifugal force at that point and to provide support for the vehicle at track junctions where a part of one of the main guide rails is removed to allow a space for the vehicle to pass through. (Both guide wheels remain up whenever the guide unit is in the lower or main line position.) A switching junction of this nature is shown in FIG. 3. Where the spur track melds with the main line track, a portion of the inner guide rail of the main track must be removed to provide acess for the guide structure carried by the vehicle. The spur rail guide members provide lateral support in both directions for the vehicle moving on the spur but due to the gap in the main line at this point, no lateral support is provided on the main line rail on one side. At this point the auxiliary support wheel 92 or 94 which is carried outside of the main track provides an additional safety feature and prevents excessive lateral displacement of the vehicle as it is passing the short track gap.

A second form of guide unit is shown in FIGS. 13–14. In this guide unit four wheels 130, 132, 134, 136 are each rotatably mounted on a rhomboid structure 138 that is connected to the splined steering shaft 85'. The wheels of this structure are mounted in a plane and they move as a unit to communicate a turning signal in accordance with the configuration of the guide track surface against which they run. In this arrangement the supplementary cam surface 124 is not required. The guide unit is raised as described above for switching functions by mechanical means or other suitable means such as an electrical solenoid actuator commensurate with the type of control structures employed in the vehicle. Where electric solenoid actuators are employed, for example, supplemental guide and support elements 67 in the form of sliders 144 and 146, disposed on either side of the rhomboid structure, may be similarly actuated. These supplemental guide elements are normally retracted and one is raised in response to a suitable actuating switch cooperating with the rail when the guide unit 66' is in the lower position and the vehicle is approaching a rail junction. The raised supplemental guide element is on the opposite side from the spur track (and from the gap in the main line guide surface 20).

In FIGS. 15–17 the vehicle body 150, there illustrated has two doors and includes conventional windows, and windshields, etc. Four seats 152 are mounted in conventional fashion and suitable control and auxiliary equipment are mounted in the vehicle, including accelerator control 154, reverse control 156, brake control 158 which operates the electric motor plugging and/or dynamic braking system and hydraulic braking system, suitable emergency brake means, lights, horn, instrumentation, rear view mirrors, windshield wipers, and other optional equipment. Mounted within the vehicle body is a steering wheel 160 coupled by a steering shaft 162 and an electrically operated clutch 164 through a steering gear box 166 to a front wheel steering linkage 168 (FIG. 16). This drive steering arrangement includes the clutch as an interlock which disables the manual steering system when the vehicle is on the rail system. The guide unit 66 is connected to shaft 85 which extends through tube 170 and angle gear unit 172 to coupling shaft 174 which is connected to a second steering linkage 176. Movement of the guide unit when the vehicle is on the rail system thus is communicated to the steering wheel 50.

The drive system illustrated includes a seventy-two volt D.C. traction type reversible electric motor 58 which has its output shaft connected by coupling 180 to a spiral mitre box 182 and from that through a gear box 184 and a universal joint 186 to the drive shaft 188 which is connected to the rear drive wheel 52. Other drive arrangements commensurate with the physical size of the components and the available space may be employed driving the rear wheel 52 as desired.

All the wheels are suspended in accordance with the accepted automotive wheel suspension practice. The steering and drive wheels may employ coil spring suspension. Due to the fact that it is desirable to raise the outrigger wheels 54, 56 under certain circumstances (as for example where the platform junction 40 is not employed and the drive rail flanges are melded), a torsion bar system having a torsion bar member 190 is employed from which the wheels 54, 56 are supported by links 192, 194 respectively. At the center of the torsion bar 190 is a lever arm 196, the forward end of which is secured to one end of a toggle linkage 198. The center of the toggle link carries a nut 200 that cooperates with a threaded shaft 202 which is driven by motor 204 to move the linkage between an extended position in which the two links are straight as illustrated in solid lines in FIG. 15 to an outrigger wheel elevated position at which the links are in the position indicated in dotted lines and the outrigger wheels are raised to provide the elevation necessary to clear the drive rail flanges.

Details of certain possible types of auxiliary guide arrangements which cooperate with the lower rail 10 are shown in FIGS. 18–22. In FIGS. 18–20 there is shown a "centerboard" arrangement 68 which is lowered when the vehicle is on the rail system so as to be positioned below the approximate center of gravity of the vehicle. This guide structure is positioned within the upstanding flanges 16, 18 of rail unit 10 and increases the lateral stability particularly when the vehicle is rounding curves.

If desired, rollers 210 may be mounted in the outer flange of the track to provide bearing members against which the centerboard structure 68 would bear, thereby reducing friction encountered under such circumstances.

The centerboard structure includes a shoe arrangement 212 which is supported by linkages 214. The centerboard is normally carried in a raised position indicated in dotted lines in FIG. 20 when the vehicle is under manual control and is lowered to the operative position by suitable means such as threaded shaft 216 cooperating with nut 218 driven by electric motor 220. Another form of centerboard structure is illustrated in FIGS. 21 and 22 and includes two roller cylinders 222 mounted on a plate 224 which is lowerable and raisable in similar manner to the arrangement shown in FIG. 20. Scoop structures 226 associated with each roller pick up air causing the roller to rotate in the direction indicated by the arrow in FIG. 21 to provide initial motion and reduce frictional force generated when the roller engages the flange of the rail unit 10.

Each vehicle can be controlled by the driver when the vehicle is on ordinary highways, for example. Power supplied by the batteries 60 carried by the vehicle is applied through a control circuit to the motor 58. A block diagram of the control circuitry is shown in FIG. 23. In that figure there is indicated the acceleration control 154, the reverse control 156 and a brake control 158 connected into a control circuit network indicated by block 230. Power from the batteries is supplied to the motor 58 through the control circuitry 230 and a switching network 232. Acceleration control is accomplished by conventional means, for example, either by switching units of the batteries 60 in and out of circuit to vary the voltage in accordance with the speed required or by inserting resistance into the motor circuit. The reversing control 156 controls the polarity of applied electric energy to the motor and the braking control 158 operates to control the application of dynamic braking and/or plugging conditions to the motor windings and may also simultaneously operate a conventional hydraulic braking unit. The number and ratings of the batteries utilized in the vehicle establishes the maximum voltage that can be supplied to the motor circuit and in this manner determines the maximum speed that can be obtained in manual operation.

Included in the circuitry is provision for recharging the batteries when the vehicle is not in use by connecting it to a domestic electric supply through a charging circuit 234. Other self-contained sources of electricity or sources of motive power may be substituted where convenient as indicated above. This compact vehicle, under manual operation, is easily maneuvered and parked and hence may be advantageously used for short trips of the nature frequently encountered in residential neighborhoods.

On commuting trips or trips of longer distances, the vehicle enters the rail system at an established entry point. When the vehicle engages an entry spur under the control of the operator, the vehicle is positioned so that the current collector mechanisms 62 engage the power supply conductors 26, 27. In one arrangement these power supply conductors are segmented and the voltage applied to them is under overall system control. In this manner the voltage supplied to the collector mechanism 62 for driving the car can be varied depending on the location of the conductor segments and the actual system conditions. When the vehicle establishes contact with the supply conductors an interlock mechanism is operated in the control circuitry 232 to automatically disconnect the self-contained power supply 60 and manual controls from the motor. Additional interlocked functions such as the locking of the doors and positioning of auxiliary stabilizing components may also be initiated in response to the establishment of system power in the vehicle.

The guide unit 66 may be raised either automatically or under the control of the operator to the upper or switching position depending on the type of control provided for that unit. For example, it is possible to incorporate sensors responsive to particular locations in the system to automatically position the guide unit. With such an arrangement all vehicle control while the vehicle is on the rail system is accomplished in response to system established criteria, either in response to passenger supplied information or independently thereof. In another arrangement a passenger may exercise control over the guide unit so that the vehicle may be switched off the main line at his option, for example. When the guide unit is established in proper position on the upper track unit 12 a second interlock in the control circuitry operates which permits transfer of system power to the drive motor in an operator controlled manner. Once this transfer to the system power is accomplished the vehicle is automatically propelled until it exits.

Under system control the vehicle is accelerated along the entry spur by increasing voltage applied in increments to the vehicle drive system as a function of the position of other vehicles on the main line so that the entering vehicle may be positioned on the main line in coordinated relation with other vehicles previously on that line. One form of entry control is diagrammatically illustrated in FIG. 24. On the main line 240 there are provided two sets of mechanically operated switches 242, 244, each switch being operated as a car passes it on that line. The launching area 38′ of the entry spur 246 is energized only when a sufficient space is detected to permit acceleration of a vehicle along the entry spur into position on the main line. In order to accomplish this assume a vehicle is waiting on the entry spur 246 for entry into the main line 240. As each vehicle passes the switch 242 the launching area section is de-energized until the main line vehicle passes switch 244. If no other vehicle has subsequently actuated switch 242, the launching area 38′ becomes energized and accelerates the waiting vehicle along the entry spur 246 for entry onto the main line. If switch 242 had been actuated by a second vehicle before the first main line vehicle actuated switch 244, the entry spur would have remained de-energized. The spacing between switch points 242 and 244 controls the timing of vehicle entry onto the main line so that danger of collision is avoided without requiring that the main line vehicles be slowed down. Once an entering vehicle starts to be accelerated due to energization of the launching area 38′ of the entry spur, that vehicle continues to be accelerated up to main line speed and enters at the detected available spot. The launching area of the spur line will remain energized as long as available space on the main line is detected by the switch arrangements 242, 244 so that more than one car may be successively accelerated into the main line where space is available. In this manner the vehicles are expeditiously accelerated and merged into the main line with other vehicles on that line.

Once a vehicle is on the main line, the guide unit is normally lowered to the running position and the vehicle is operated at a speed controlled by the system voltage applied via the segments 26, 27. The vehicles may operate on the main line at a constant speed, or if it is desired to run the vehicles in "trains" of closely spaced vehicles (see e.g. FIG. 1), each entering vehicle may be automatically accelerated at say ten m.p.h. faster than the system speed until it approaches the car immediately in front of it (the presence of the preceding car being detected by a proximity device or other suitable means), at which time it is automatically returned to system speed so that it runs in proximity with the vehicle immediately in front of it in train configuration.

When a vehicle approaches a spur at which exit is desired, the guide unit is raised (automatically or manually) before the car arrives at the junction in that upper level position the guide unit switches the car out of the main line onto the spur automatically. For example before spur 248 shown in FIG. 24 a switch actuator 250 is positioned. If the control is programmed to be actuated at that point the guide unit 66 will be raised. This automatic programmed control of exit sensing may be set into the car-s control apparatus before it entered the system. Alternatively the guide unit may be under operator control. Due to the form of switch mechanism employed in the system it is possible to switch vehicles out of the closely spaced train configuration without affecting the overall speed of the other vehicles in any respect. When a vehicle enters an exit spur it is automatically decelerated, as by reduction of system voltage, automatic application of braking means such as plugging or dynamic braking (which can be initiated by mechanically actuated switches on the spur rail for example or by timers which operate in response to an exit spur signal when such an arrangement is employed).

A suitable electric circuit employing interlock relays 260, 262 is shown in FIG. 25. In the indicated circuit when the collector mechanism 62 engages power supply lines 26, 27, relay 260 is energized and operates contacts 260–1 (de-energizing the manual motor control circuitry), contacts 260–2 (energizing the steering gear clutch 164 and applying power to operate control servos including the guide unit servo motor 122, centerboard servo motor 220, auxiliary equipment 264 such as door latch locks, and automatic braking control circuitry 266), and contacts 260–3 (connecting battery charger 234 to the system power source). When the guide unit 66 reaches its upper position it closes a circuit which energizes relay 262 to close a main power line control contact 262–1 (allowing power to be supplied via the collector 62 to the motor 58) and a hold contact 262–2 (which provides a holding circuit bypassing the servo 122 so that relay 262 may remain energized independent of the position of the guide unit 66). Additional control switches indicated in the circuitry permit manual or automatic control operations for the several indicated components. For example, switch 268 enables the application of system power to the motor 58 to be manually controlled, switch 270 controls the raising and lowering of the guide unit while the vehicle is on the system and switch 272 may be operated by a cam on a spur as the vehicle is leaving the main line to decelerate the vehicle automatically.

A system employing an automobile of more conventional wheel arrangement is shown in FIGS. 26–43.

With reference to the vehicle shown in FIGS. 26–28, the vehicle is of generally conventional configuration and has a body 310 and four foam filled, rubber tired road wheels 312, 314 which are arranged in the usual rectangular configuration, the front wheels 312 being steerable and the rear wheels 314 being driven by the motor drive system 318. That system drive includes an internal combustion engine 320 and an electric motor 322 which may be selectively coupled in suitable manner, as through a transmission 324 and differential 326 to axle 328, to drive the rear wheels 314. In an alternative arrangement the vehicle may be driven by a single source, for example an internal combustion engine, which is operative under conventional manual control when the vehicle is off the track system and under automatic control from control power supplied by a suitable connection when it is on the track system. The vehicle, as illustrated, is designed to seat three passengers abreast, and includes two doors and conventional auxiliary equipment such as headlights, windshield wipers, bumpers, etc. Shock type bumpers 329 are employed on the vehicle and they house magnets which are selectively energized or positioned for control of trains of vehicles as hereinafter described.

The vehicle controls include accelerator control 330, forward-reverse control 332 and brake control 334. A steering wheel 340, which may be of conventional type, is coupled by shaft 342 through steering linkage 344 to control the position of the front wheels 312. Preferably, the steering arrangement includes a clutch 346 which acts as an interlock and disables the manual steering system in response to system power when the vehicle is on the rail system.

The lower portion of the body 310 of the vehicle is formed in recessed configuration adjacent the wheels and provides a channel 350 (FIG. 28) which receives a flange portion 352 of the guide track 354 as shown in FIGS. 30 and 31. This guide track has two identical track elements, one of which receives the left wheels and the other receiving the right wheels. Each track element is C-shaped in cross-section and has a depending member 356 which supports a guide member, and an upstanding edge 358 which provides supplementary guiding.

As best indicated in FIGS. 31 and 32 each front wheel 312 is supported on an axle 366 which may be secured to the vehicle frame 368 by suitable resilient means such as leaf spring 370. The end 372 of the axle is formed to receive a kingpin arrangement including a "cylinder" 374. Each cylinder is connected by means of arm 376 and coupling 378 to the vehicle steering linkage 344. The cylinders are mounted on a brake drum structure or other suitable element 382 for rotation about a vertical axis of sufficient magnitude to provide proper control of the vehicle's direction. Also secured to the cylinder supporting structure 382 is a mud guard structure 384. The kingpin element 374 has a channel of square or oval cross-section for example which is constructed in a twin double acting hydraulic cylinder mechanism. Two piston elements 386, 388 each of corresponding cross-section are mounted therein. In the lower portion of the mechanism a sealed fluid free chamber 389 is formed, in which is mounted a pair of electrical contacts 390, 392 which cooperates with a slide switch element 394 secured on the piston rod 396. The engagement of element 394 with contacts 390 or 392 completes an electrical circuit that provides a positive indication of the position of the piston rod 396 and the guide channel 400 that is secured at the upper end of the piston rod. The upper cylinder section has fluid ports 402, 404 and the lower cylinder section has fluid ports 406, 408. Fluid is admitted to two hydraulic chambers in each mechanism in parallel so that continuity of control is assured even though one hydraulic circuit fails.

A cross section of the track is shown in FIG. 31 adjacent the front wheel 312. The channel has a drive surface 410 on which the tire of the vehicle runs, a relatively short inner wall 412 (part of the lower edge flange 358) and an upstanding outer wall 414 having a horizontal flange 416 which terminates in a depending edge member 356 on which is secured the smoothly rounded guide rail structure 418. The rail 418 has a guide surface configuration 420 with which the guide channel 400 mates for guiding purposes. Also mounted on the lower surface of the horizontal flange 416 of the track channel is an electrical conductor 422 spaced from the track channel by suitable electrical insulation 424.

A top view of the structure is shown in FIG. 32. As there indicated the guide channel 400 is an elongated member so that it contacts the guide rail 418 along a substantial length. The guide channel is directly coupled to the wheel 312 through the square piston kingpin assembly, and thus when it is in engagement with the guide rail there is positive steering control of the vehicle by the system.

A system for coupling power to the vehicle is shown in FIG. 33. A conductor 426 supported in insulated relation from the rear mud guard 428 inside body channel 350 is carried in sliding or wiping engagement with the system conductor 422. This conductor 426 receives power from conductor 422 and applies it to circuitry within the vehicle for controlling the movement of the vehicle along the track system. In a slightly modified embodiment of the guide and power conductor, shown in FIG. 34, a spring loaded pick up shoe 440 carried by the vehicle is mounted directly on the guide channel 400' and engages power conductor 422' which is located in insulated relation immediately adjacent the depending guide rail 418'.

Still another configuration of guide structure is shown in FIGS. 35 and 36 in which two guide channels in the form of sectors 450, 452 are mounted on a laterally extending shaft 454. The sectors 450, 452 are on opposite sides of the vehicle as indicated in FIG. 35 and each is connected through the steering linkage to the front wheels 312. In the position shown the sector on the right side of the car is in engagement with the guide rail 418. By rotation of shaft 454 in the counter-clockwise direction approximately 150° the right sector 450 will be disengaged from the associated rail and the left sector 452 will be disposed in position for engagement with the cooperating rail. Rotation of shaft 454 is controlled by a rack and pinion drive 456, 458 cooperating with the shaft 454 and driven by two cylinders 460, 461.

A third embodiment of a system controlled steering mechanism is shown in FIGS. 37–39. In this embodiment as in the others the system steering control mechanism may be interlocked with the manually controlled steering linkage which is coupled to the main steering linkage 462 by means of pivotally mounted cross bar 463 and link 464. Also connected to the main steering linkage are two sets of three rollers 466–468 mounted on link 470 and rollers 472–474 mounted on link 476. Each set of rollers includes a laterally spaced pair of rollers mounted at the forward end of the link and a rear guide roller. These sets of rollers are mounted for vertical movement on a parallelogram arrangement having horizontal members 477, 478 and vertical members 480, 481 which slide in guides 482 secured to the vehicle frame. This parallelogram arrangement is mounted for tilting movement about the shaft 483 and is supported by flanges 484. Suitable mechanical or hydraulic control will tilt the structure so that the set of rollers 466–468 or the set of rollers 472–474 will clear the upstanding guide rail flanges 490 or 492 on the track channel (corresponding to the guide rail 418) in the embodiments shown in FIGS. 31–36. In the same manner the track channels have a running surface which supports the vehicle. As in the case of the other types of channel the vertical outside wall of the track channel provides additional guiding and safety hubs may be employed which contact the vertical wall if the guiding structure fails. The wheels of the car thus are totally enclosed. The track structure further includes a portion extending over the top of the vehicle wheels which assures complete control of the vehicle.

In the operation of this steering mechanism, both sets of rollers normally engage guide flanges 490, 492. If the car is to be switched to the right, the parallelogram structure (links 477, 478, 480, 481) is tilted so that the left guide structure (rolls 472, 473, 474) are rotated up away from the guide rail 492 and the right guide structure (rolls 466, 467, 468) move down along the guide rail 490. (At the switch area the guide surface of the right rail is lower in height.) As the right guide rail 490 curves away from the left guide rail 492, the guide unit follows it and moves the steering link 463, which movement is coupled by link 464 to the rear or main steering link bar 462 which acts on the bell cranks to rotate the front wheels 312'. The curvature of the guide rail is thus coupled directly to the steerable wheels so that control of the vehicle's direction is provided automatically.

A modified form of system steering structure is shown in FIG. 40. This structure employs a kingpin "cylinder" 500 similar to that shown in FIGS. 31 and 32 with the guide channel 502 disposed below rather than above the cylinder. In this embodiment the guide rail 504 is a recessed member mounted just inside of the track surface 506. A vertical flange 508 provides supplemental guiding and protection. (An alternative arrangement employs an upstanding guide flange just outside the track surface and a cooperating vehicle carried steering linkage.) In a manner similar to the embodiments of FIGS. 31–36 only the left steering channel or the right steering channel is in engagement with a guide rail 504 at any one time, the two steering channels being interlocked to avoid simultaneous engagement except for transitional instants. An electrical conductor 510 may be mounted in an insulated recess 512 adjacent the guide rail 504 and a contact in the form of a wiper, carried by the vehicle adjacent the rear wheel structure, for example, engages this conductor to transfer system power to the vehicle.

Still other guide surface configurations useful in transportation systems will occur to those skilled in the art. For example, two spaced shoes 530–532, FIG. 41, mounted on linkages 534, 536 and pivotally secured to the steering structure 538 may be utilized in cooperation with a guide rail system. These steering shoes are aligned with one another in a position controlled by a hydraulic cylinder 540 mounted for free vertical movement. The cylinder 540 has piston rods 542, 544 coupled to links 534, 536. In the position shown in FIG. 41 the two shoes 530, 532 engage a guide rail 546 to provide steering control for the vehicle. With the hydraulic cylinder energized the links 534, 536 are rotated to the dotted line position so that the shoes 530, 532 are disengaged from the guide rail 544. In some transportation systems adequate steering control may be obtained through the sensing of the position of the guide structure, by electronic means, for example, rather than by the physical contact with a guide rail.

An illustrative layout of the guide rails at an entrance and exit spur on a section of the main line is shown in FIG. 42 and a detailed view of the exit spur is shown in FIG. 29. The vehicles travel along the main line in the direction indicated by the arrows and normally have their left guide channel in engagement with the left guide rail 550. (The vehicle support track is indicated in dotted lines.) The right guide rail 552 branches off the main line into a discharge area 554 at which area the vehicles are removed from the system control and can be driven manually. As a vehicle moves along the main line it encounters a block signal 556 which may cause preprogrammed circuits to switch control from the left rail 550 to the right rail 552. The guide rail contact then automatically steers the car from the main line into the exit area.

Adjacent the exit spur is an entrance spur guide rail 558 starting from an entrance area generally indicated as 560 and passing under the exit spur. Rail 558 approaches the main line in a generally tangential direction so that a vehicle may enter the main line at full speed. Once it is on the system a suitable indicator, such as cam block 562, is sensed and control is automatically transferred from the entrance guide rail 558 by disengagement of the vehicle carried right guide channel and engagement of the left guide channel with rail 550 for movement along the main line. (Should there be a mechanical malfunction of some type so that switching from the right guide channel to the left guide channel is not accomplished or full speed is not achieved for example, an auxiliary spur 564 may be provided by which the vehicle is removed from the transportation system.) Other forms of guidance may be employed as desired to provide the necessary control. For example, rather than a single main line rail being utilized, in this case the left rail 550 with entrance and exit from space to the right, facility for switching off and on the main line from either side may be achieved with a somewhat more complex control system. In such a system the selection of the guide channel would be automatically controlled by a suitable programmer to permit the vehicle to stay on the main line as long as desired.

A more detailed view of the track structure at the exit spur is shown in FIG. 29 with a train of vehicles 571–576 moving along the main line. Along the main line, as indicated at the upper and lower portions of FIG. 29, the two guide tracks 354 are spaced from one another and are provided with a relatively short upstanding inner flange 358. In the vicinity of the exit spur the upstanding flanges 358 are omitted and the track drive surface 410 is extended across the entire width of the track in a flat plate configuration 580 to provide support for the vehicle across the transition. While a train is proceeding as indicated in FIG. 29 the spacing of the cars (shown in contact with one another) is controlled by suitable sensing devices (for example, infra red sensors, photoelectric devices, or magnetic sensors) so that in the unit vehicles run in closely adjacent configuration. Where magnetic elements in shock type bumpers are employed the cars may be magnetically coupled into trains. Individual cars, however, may be switched out of the "train" as desired without reduction of speed or the necessity for any mechanical movement of the rail system. In this case the lead car 576 and the fourth car 573 are leaving on the exit spur. In order to accomplish this all that is required is that on the detection of a programmed exit request (as from cam block 556— FIG. 42) the right control channel be engaged at a point prior to the exit spur and the left channel be disengaged. (This transfer actuation preferably is interlocked in the system to prevent any change in the guiding channels unless guide rails on both sides of the track are present. Usually such a transfer can occur only at predetermined locations along the track system.) The magnetic couplers are actuated to repel the cars immediately in front and immediately behind the car to be switched out. When this transfer does occur there is little or no change in vehicle speed but the vehicles that are to exit will be guided by the right rail rather than the left rail and they will be automatically extracted from the "train" without any reduction in the speed of the rest of the cars along the main line. As each car enters the exit spur, however, the control power is adjusted to decelerate the car at a reasonable rate as the vehicle approaches the terminal area 554 at which point the vehicles are stopped and the transfer to manual control is made.

FIG. 30 illustrates the use of this transportation system in an arrangement where the two track systems are superimposed so that vehicles moving in one direction are on the upper level and vehicles moving in the opposite direction are on the lower level. If desired the system may operate at ground level.

A block diagram of a typical control system to be associated with these concepts is shown in FIG. 43. This figure depicts vehicle-borne equipment, and stationary equipment required in this particular version for overall control of traffic.

Prime driving power is provided by a servo-controlled motor 600, which may be either of the electrical or internal combustion type. The motor control is a speed servo using tachometric feedback 602. Provision is indicated for operation of this motor system either by command from a manually operated throttle 604 for use off the rail system or by command from the rail system through the third rail over line 606. During operation on the rail system the speed control servo is also subjected to an input from a "Vehicle Ahead Sensing and Command System" 608. This latter unit exists for safety reasons to provide indications of other vehicles ahead in terms of relative range and/or relative range rate, and may be implemented by use of cooperative radio frequency beacons or photocells operative in the near visible or visible spectrum ranges or similar devices as indicated above. This system may also be used in conjunction with exit spur energy sources and a vehicle borne programmer 610 to assure proper speed reduction prior to exit from the track system.

The steering mechanisms previously discussed are also operated in a servo-controlled manner—in this case, by either an on-off or an on-off-neutral position type. Basic power for steering mechanism operation may be electrical, hydraulic or pneumatic. Also indicated are a car-mounted detector 612 and programmer 614 to allow recognition of, and automatic switching at, pre-chosen exits. Exit recognition signals may be coded or as shown in this version may simply consist of a sum of block signals, each block being a relatively short section of guide track. In this application, a predetermined number of blocks corresponding to the desired routing may be set into the programmer, and travel over the last of the predetermined number initiates the automatic switching of the steering mechanism servo 616.

Braking action required in the operation of the vehicle is shown in the diagram to be provided by a servo-controlled braking unit 618 with longitudinal acceleration feedback 620. As indicated this braking system can be operated manually (line 622) when off the rail system and has inputs from the steering system programmer 614 and from the Vehicle Ahead Sensing and Command unit 608.

Also indicated as vehicle-borne equipment in FIG. 43 is a signal from the drive motor comparator which, in the event of abnormal operation, provides a signal over line 624 to initiate actuation of mechanical lock pin structures associated with the guide channel control mechanism to preclude occurrence of switching under these circumstances. Also shown is a signal from the same comparator in the event of complete loss of power which, by means of perhaps an inertia or gravity operated signal source provides evidence through the Power Loss Detector 626 to the stationary equipment 628 of such a power failure.

In this particular implementation overall traffic control is exercised by a Central Control Computer 628 which obtains information concerning car positions and average speeds through the Block Signal Source 630 and information on power failures through the Power Loss Detector 626. In turn the computer controls power and/or signals to the third rail 632 and provides information for signalling and control of vehicle entry and exit at the separate entrances and exits.

For simplicity, the switching required to accomplish such functions as declutching the steering wheel, removing manual throttle and braking inputs, etc. as desired for safety, is not shown in this diagram.

Thus it will be seen that the invention provides improved vehicle and transportation system arrangements in which a vehicle drivable under manual control may be integrated into a high density transportation system for movement on that system under automatic control. Vehicle control is automatically transferred from manual control to automatic control when the vehicle enters the system and it is moved under overall system supervision within the transportation system. Switch arrangements are provided which enable the vehicle to enter or leave the system without affecting the overall speed of the other cars. The vehicles and transportation system of the invention facilitate parking arrangements such as a multi-level rail structure for example. With such structural arrangement manually controlled vehicles are left at the structure for automatic dispatch to parking storage locations and recall from those locations through a central control system without the necessity of an operator to control them. Such arrangements further require substantially less space than present types of automobile parking garages and permit large numbers of vehicles to be easily and quickly handled in an integrated manner due to uniformity of the vehicle size and configuration.

While particular types of systems have been described, employing an elevated structure, for example, it will be understood that drive surface may be at ground level with an adjacent control rail that cooperates with the vehicle guide unit, provided adequate protection against obstacles on the right of way can be assured. Various sizes of vehicles may be employed—it being possible that a two passenger vehicle may be most advantageous in commuter systems but larger bodies which accommodate ten passengers for example might also be constructed on basically the same chassis as the smaller types of passenger vehicles. Certain modifications of the specific disclosed mechanical arrangements are of course contemplated to be within the scope of the inventions. For example in place of the steering shaft 85 connecting the guide unit to the steerable wheel 50 a hydraulic or an electrical link might be provided. Other types of propulsion arrangements may be employed under certain circumstances—for example, the external power may be supplied at a high voltage to a motor designed to operate at such a voltage and a supplemental prime mover such as a small internal combustion engine would be employed for propulsion off the controlled transportation system. In such an automatic propulsion system the electric drive might be in the form of a linear motor arrangement with flat parallel field coils adapted to receive a fixed rail functioning as an armature between them. In other arrangements air suspension techniques might be employed where travel at high speed is desired. Additions and modifications in the track system are contemplated such as the provision of several branches at each entrance or exit spur so that a greater number of vehicles may be accommodated.

While preferred embodiments of the invention have been shown and described, additional modifications thereof will be obvious to those skilled in the art. Also, it will be appreciated that while the invention has particular advantages in a mass transportation system, the invention also has application in other transportation systems, and in toys or amusement games. Therefore, it is not intended that the invention be limited to the disclosed embodiments or to details thereof and departures may be made therefrom within the spirit and scope of the invention as defined in the claims.

What is claimed is:

1. In combination, a transportation system having a vehicle drive surface of indeterminate length,
    and a guide member disposed parallel to and coextensive with said drive surface,
    and electric power supply means disposed adjacent said drive surface and guide member and coextensive therewith,
    a vehicle adapted to cooperate with said drive surface and said guide member for movement therealong,
    said vehicle including passenger controlled means operative when said vehicle is not on said transportation system for controlling the steering and propulsion of said vehicle,
    self-contained power supply means for use in the propulsion of said vehicle when said vehicle is not on said transportation system,
    connecter means adapted to engage said electric power supply means to transfer power from said electric power supply to said vehicle when said vehicle is on said transportation system,
    vehicle drive means adapted to cooperate with said drive surface for propelling said vehicle along said drive surface in response to electric power from said power supply means,
    and control means cooperating with said guide member for providing directional control of said vehicle while said vehicle is on said transportation system.

2. In combination with a transportation system having a vehicle drive surface of indeterminate length,
    a guide member disposed parallel to and coextensive with said drive surface,
    and first power supply means disposed adjacent said drive surface and guide member and coextensive therewith,
    a vehicle adapted to cooperate with said drive surface and said guide member for movement therealong,
    said vehicle including passenger controlled means operative when said vehicle is not on said transportation system for controlling the steering and propulsion of said vehicle,
    second power supply means carried by said vehicle for use in the propulsion of said vehicle when said vehicle is not on said transportation system, connector means adapted to engage said first power supply means to transfer power from said first power supply means to said vehicle when said vehicle is on said transportation system, vehicle drive means adapted to cooperate with said drive surface for propelling said vehicle along said drive surface in response to power from either power supply means, first control means cooperating with said guide member for providing directional control of said vehicle while said vehicle is on said transportation system, and second control means responsive to the positioning of said vehicle on said transportation system to disable said passenger controlled steering and propulsion control means.

3. In combination, a transportation system having a generally horizontal drive surface of indeterminate length, a generally vertical guide surface disposed parallel to and coextensive with said drive surface, and system electric power supply means disopsed parallel to and coextensive with said drive surface, and a vehicle having a plurality of wheels adapted to engage said drive surface, said vehicle including an electric motor connected in driving relation to at least one of said wheels, electric power supply means carried by said vehicle, passenger operated means for controlling the steering of said vehicle and the application of power from said vehicle carried power supply to said motor, connector means adapted to engage said system power supply means to transfer power from said system power supply to said electric motor when said vehicle is on said transportation system, guide means cooperating with said guide surface for providing directional control while said vehicle is on said transportation system, and control means responsive to the positioning of said vehicle on said transportation system to disable said passenger controlled means, to disconnect said vehicle carried power supply from said motor and to connect said connector means to said motor.

4. In combination with a transportation system having a vehicle support rail unit of indeterminate length, said support rail unit having generally horizontal drive surface, a coextensive guide rail unit disposed parallel to and above said support rail unit, said guide rail unit having a pair of spaced generally vertical guide surfaces, system electric power supply means disposed parallel to and coextensive with said support and guide rail units, a vehicle adapted to be positioned between said support and guide rail units, said vehicle including, a guide unit carried by said vehicle for cooperation with said guide rail unit to provide directional control of said vehicle while said vehicle is on said transportation ssytem, drive means adapted to cooperate with said support rail unit for propelling said vehicle along said support rail unit, self-contained power supply means carried by said vehicle, first connector means for connecting said vehicle carried power supply means to said drive means, passenger controlled means for controlling the steering of said vehicle and the application of power from said vehicle carried power supply to said drive means, second connector means adapted to engage said system power supply means to transfer power from said power supply to said drive means when said vehicle is on said transportation ssytem, and control means responsive to the positioning of said vehicle on said transportation system to disable said passenger control means and to operate said first connector means to disconnect said vehicle carried power supply means from said drive means.

5. In combination with a transportation system having a vehicle support member of indeterminate length, fixed guide means disposed parallel to and coextensive with said support member, having a first surface associated with a first line and a second surface associated with a second line, a vehicle for use with said support and guide members, said vehicle including drive means adapted to cooperate with said support member for propelling said vehicle along said support member, and control means cooperating with said guide means for providing directional control while said vehicle is on said transportation system, said control means including a unit adapted to engage said guide means surfaces and being movable between a first position for engagement with said first surface and a second position for engagement with said second surface.

6. A transportation vehicle comprising power supply means carried by the vehicle, vehicle drive means, first coupling means for coupling said vehicle carried power supply means to said drive means, passenger operated means for controlling the application of power from said vehicle carried power supply means to said drive means, second coupling means for coupling an external source of power to said vehicle to control the propulsion of said vehicle externally of said vehicle, and means operable in response to the application of power to said vehicle via said second coupling means to disable said first coupling means and said passenger operated control means.

7. A transportation vehicle comprising electric power supply means carried by the vehicle, vehicle drive means, first coupling means for coupling said vehicle carried power supply means to said drive means, passenger controlled means for controlling the application of power from said vehicle carried power supply means to said drive means for propelling the vehicle, second coupling means for coupling an external source of electric power to said vehicle to control the propulsion of said vehicle externally of said vehicle, and means operable in response to the application of electric power to said vehicle via said second coupling means to disable said first coupling means and said passenger operated control means.

8. A transportation vehicle comprising a plurality of wheels adapted to engage a drive surface, an electric motor coupled to at least one of said wheels, a vehicle steering mechanism coupled to at least one of said wheels, a source of electric power carried by the vehicle, first coupling means for coupling said vehicle carried power source to said electric motor, passenger operated means for controlling the application of power from said vehicle carried power source means to said electric motor and for controlling the operation of said steering mechanism, second coupling means for coupling an external source of electric power to said electric motor, and means operable when said external source of power is coupled to said electric motor via said second coupling means to operate said first coupling means to disconnect said vehicle carried power source from said motor and to disable said passenger operated control means.

9. A transportation system including a line having a vehicle support unit of indeterminate length, a coextensive guide unit disposed parallel to said support unit, energy supply means disposed adjacent said support and guide units, a vehicle positionable adjacent said support and guide units for movement along said line including a vehicle body, passenger control means operative when the vehicle is not on said line for controlling the steering and propulsion of said vehicle, means mounted below said body for cooperation with said support unit, means engagable with said energy supply means for propelling the vehicle along said line, a steering structure cooperating with said guide unit for providing directional control of the vehicle while it is on said line, and control means responsive to the positioning of the vehicle on said line to disable said passenger controlled steering and propulsion means.

10. In a vehicle, a control mechanism comprising a steerable road wheel, guide follower means carried by said vehicle and coupled to said wheel, said guide follower means being shiftable between a first position for controlling the steering of said vehicle along a first path and a second position for controlling the steering of said vehicle along a second path, and means to shift said guide follower means between said first and second positions to control the steering of said vehicle.

11. The control mechanism as claimed in claim 10 and further including a passenger controlled steering mechanism coupled to said steerable wheel.

12. The control mechanism as claimed in claim 11 and further including means to disable said passenger controlled mechanism when said guide follower means is operative.

13. In a vehicle the combination comprising a source of drive energy carried by said vehicle, a driven road wheel, passenger operated means for controlling the application of energy from said source to said road wheel, and means carried by said vehicle for coupling energy from a source external to said vehicle to control the application of energy to said road wheel.

14. The combination as claimed in claim 13 and further including means responsive to the application of external energy to said vehicle via said coupling means to disable said passenger operated means.

15. A transportation system having a vehicle support surface of indeterminate length, two guide means extending along said support surface parallel thereto, said guide means diverging from one another at a junction, and a vehicle for use on said system including a steerable road wheel, follower means carried by said vehicle adapted to be coupled to said guide means and means to shift said follower means between said first and second positions to control the steering of said road wheel as a function of a selected one of said guide means.

16. The system as claimed in claim 15 and further including a passenger controlled steering mechanism coupled to said steerable wheel.

17. The system as claimed in claim 16 and further including means to disable said passenger controlled mechanism when said follower means is coupled to said guide means.

18. A transportation system having a vehicle support surface of indeterminate length, two guide means extending along said support surface parallel thereto, said guide means diverging from one another at a junction, power supply means extending along said support surface parallel thereto, and a vehicle for use on said system including a plurality of road wheels at least one of which is steerable, follower means carried by said vehicle adapted to be coupled to said guide means, means to shift said follower means between said first and second positions to control the position of said steerable wheel as a function of a selected one of said guide means and means carried by said vehicle for coupling energy from said power supply means to control the application of propulsion power to said road wheel.

19. The system as claimed in claim 18 wherein said vehicle includes passenger operated means for controlling the application of energy from said source to said road wheel, and means responsive to the application of external energy to said vehicle via said coupling means to disable said passenger operated means.

20. A transportation system comprising a track defining a vehicle path and providing a support for the vehicle as it moves therealong, at least two guide structures, said guide structures being fixed in position and diverging from one another at a junction, each said guide structure extending along the track for providing directional guidance to a vehicle as it moves along the track, and a vehicle for controlled movement along said track, said vehicle including a steering mechanism and two guide followers, each guide follower being coupled to the vehicle steering mechanism and being responsive to different ones of said guide structures, and means to selectively actuate said guide followers to control the vehicle steering as the vehicle moves along said track in response to the position of the guide structure to which the actuated guide follower is responsive with at least one of said guide followers being controlled by the associated guide structure at all times while said vehicle is on said track.

21. A transportation system comprising a drive surface, a control rail on each side of said drive surface, said control rails being fixed in position and diverging from one another at a junction, a vehicle having at least one steerable wheel and means for propelling said vehicle along said drive surface, a guide follower mechanism coupled to said steerable wheel on each side of said vehicle adapted to cooperate with a correspondingly positioned control rail, each said guide follower being movable between a first position in engagement with the associated control rail and a second position out of engagement with the associated control rail, and means to actuate said guide followers for engaging said control rails with at least one of said guide followers in engagement with the cooperating control rail while said vehicle is on said drive surface.

22. The transportation system as claimed in claim 21 wherein each said guide follower is adapted to engage the cooperating control rail at a plurality of points spaced along the length of said control rail.

23. A transportation system comprising a track defining a vehicle path and providing a support for a vehicle as it moves therealong, said track including a main portion and a spur portion, at least two fixed guide structures, said guide structures being disposed on opposite sides of said track where said main and spur portions join, each said guide structure extending a predetermined length along said track for providing directional guidance to a vehicle as it moves along the track, and a vehicle for controlled movement along said track, said vehicle including two steerable wheels, a steering linkage coupling said steerable wheels together, two guide followers, each said guide follower being movable into and out of engagement with the corresponding guide structure so that each guide structure provides, through said steering linkage, positive positioning of said steerable wheels when the cooperating guide follower mechanism is engaged therewith, and means to selectively actuate said guide followers to control the position of said steerable wheels as the vehicle moves along said track in response to the position of the guide structure to which the actuated guide follower is responsive, with at least one of said guide followers in engagement with the associated guide structure at all times while said vehicle is on said track and only one of said guide followers in engagement with its associated guide structure and the other guide follower completely disengaged from its associated guide structure during intervals of switching between the main and spur portions.

24. A transportation system comprising a track defining a vehicle path and providing a support for a vehicle as it moves therealong, said track including a main portion and a spur portion,
at least two guide structures,
said guide structures being disposed on opposite sides of said track where said main and spur portions join,
each said guide structure extending a predetermined length along said track for providing directional guidance to a vehicle as it moves along the track,
and a vehicle for controlled movement along said track,
said vehicle including two steerable wheels,
a steering linkage coupling said steerable wheels together,
two guide followers,
each said guide follower being directly coupled to a corresponding steerable wheel,
each said guide follower being movable into and out of engagement with the corresponding guide structure so that each guide structure when the cooperating guide follower mechanism is engaged therewith provides positive positioning of the directly coupled wheel and corresponding positioning through said steering linkage of the other steerable wheel,
and means to selectively actuate said guide followers to control the position of said steerable wheels as the vehicle moves along said track in response to the position of the guide structure to which the actuated guide follower is responsive,
with at least one of said guide followers in engagement with the associated guide structure at all times while said vehicle is on said track and only one of said guide followers in engagement with said associated guide structure and the other guide follower being completely disengaged from its associated guide structure during intervals of switching between the main and spur portions.

25. A transportation system comprising a track defining a vehicle path and providing a support for a vehicle as it moves therealong, said track including a main portion and a spur portion,
at least two fixed guide rails,
said guide rails being disposed on opposite sides of said track where said main and spur portions join,
each said guide rail extending a predetermined length along said track for providing directional guidance to a vehicle as it moves along the track,
and a vehicle for controlled movement along said track,
said vehicle including two steerable wheels,
a steering linkage coupling said steerable wheels together,
a transverse control linkage having guide follower elements on either end thereof,
said control linkage being directly coupled to said steering linkage for controlling the positions of said steerable wheels,
each said guide follower being movable into and out of engagement with the corresponding guide rail so that each guide rail when the cooperating guide follower mechanism is in mating engagement therewith provides positive positioning through said steering linkage of said steerable wheels, and means to selectively actuate said control linkage to coordinately position said guide followers and said steerable wheels as the vehicle moves along said track in response to the position of the guide rail to which the guide followers are responsive, said control linkage maintaining at least one of said guide followers in engagement with the associated guide rail at all times while said vehicle is on said track and only one of said guide followers in engagement with said associated guide rail and the other guide follower being completely disengaged from its associated guide rail during intervals of switching between the main and spur portions.

26. A vehicle for controlled movement along a track having at least two guide structures associated therewith, said vehicle including a steering mechanism and two guide followers coupled to said steering mechanism, and means to selectively actuate said guide followers to render one of said guide followers responsive to the cooperating guide structure so that the direction of vehicle movement along said track is controlled by the position of the guide structure to which the actuated guide follower is responsive.

27. A vehicle for use on a track defining a vehicle path and providing a support for the vehicle as it moves therealong, said track having at least two guide structures that extend along said path for providing directional guidance to the vehicle as it moves therealong, said vehicle comprising a body,
a prime mover carried by said body,
two steerable wheels,
an automatically controllable steering mechanism including two guide followers, one on each side of said vehicle body,
a steering link coupling said steerable wheels and said automatically controllable steering mechanism together,
each said guide follower adapted to be responsive to the corresponding guide structure on said track so that each guide structure, when the cooperating guide follower is responsive thereto, provides positive positioning through said steering linkage of said steerable wheels,
and means to selectively actuate said automatically controllable steering mechanism to control the position of said steerable wheels as the vehicle moves along said track in response to the position of the guide structure to which the actuated guide follower is responsive.

28. A vehicle for use on a track defining a vehicle path and providing a support for the vehicle as it moves therealong, said track having at least two guide structures that extend along said path for providing directional guidance to the vehicle as it moves therealong, said vehicle comprising a body,
a prime mover carried by said body,
a manually controllable steering mechanism,
two steerable wheels,
a steering link coupling said steerable wheels and said manually controllable steering mechanism together,
an automatically controllable steering mechanism including two guide followers, one on each side of said vehicle body,
each side guide follower adapted to be responsive to the corresponding guide structure on said track so that each guide structure, when the cooperating guide follower is responsive thereto, provides positive positioning through said steering linkage of said steerable wheels, means to selectively actuate said automatically controllable steering mechanism to control the position of said steerable wheels as the vehicle moves along said track in response to the position of the guide structure to which the actuated guide follower is responsive, and means to disable said manually controllable steering mechanism while said vehicle is on said track.

29. A transportation system comprising a drive surface,
- a control rail on each side of said drive surface,
- a vehicle having at least one steerable wheel and means for propelling said vehicle along said drive surface,
- a guide follower mechanism coupled to said steerable wheel comprising a link extending across substantially the entire width of said vehicle,
- said link being pivotally mounted at its center and carrying a guide follower structure at either end thereof and adapted to cooperate with the adjacent control rail, and
- means to tilt said link to move one of said guide follower structures into engagement with its cooperating control rail and to disengage the other of said guide followers from its cooperating control rail for providing vehicle control by one guide follower only.

30. A vehicle comprising a body, a plurality of rotatably mounted wheels secured to said body therebelow and adapted to engage a drive surface, one of said wheels being a steerable wheel and another of said wheels being a drive wheel,
- a steering structure for engagement with guide elements external of said body,
- means coupling said steering structure to said steerable wheel,
- means for coupling an external source of energy to said vehicle to rotate said driven wheel,
- a second source of energy stored within said body,
- means for employing said second energy source to rotate said driven wheel,
- passenger operated means for controlling the application of energy from said second source to said driven wheel,
- passenger controlled steering mechanism coupled to said steerable wheel,
- and means responsive to the connection of said external source of energy to said vehicle via said coupling means to disable said passenger operated energy control means and said passenger controlled steering mechanism.

31. In combination with a transportation system having a vehicle support member of indeterminate length,
- fixed guide means disposed parallel to and coextensive with said support member, having a first surface associated with a first line and a second surface associated with a second line,
- a vehicle for use with said support and guide members,
- said vehicle including drive means adapted to cooperate with said support member for propelling said vehicle along said support member,
- and control means cooperating with said guide means for providing directional control while said vehicle is on said transportation system, said control means including a unit adapted to engage said guide means surfaces and being movable while said vehicle is on said first line between a first position in engagement with said first surface and a second position in engagement with said second surface for transferring directional control of said vehicle between said first and second surfaces.

No references cited.

ARTHUR L. LA POINT, *Primary Examiner.*

S. T. KRAWCZEWICZ, *Assistant Examiner.*